UNITED STATES PATENT OFFICE.

SILAS L. LOOMIS AND CHARLES T. SHEPHERD, OF WASHINGTON, D. C.

IMPROVEMENT IN COMPOUNDS FOR KINDLING FIRES.

Specification forming part of Letters Patent No. 131,011, dated September 3, 1872.

Specification describing a Compound for Preparation of Artificial Fuel, invented by SILAS L. LOOMIS and CHAS. T. SHEPHERD, of Washington, District of Columbia.

The invention consists of a compound to be used in the preparation of a new and improved kindling material for the purpose of lighting fires speedily; and is composed of the following ingredients, in manner and proportion as herein set forth.

Resin, seventy-eight parts; acid tar, nine parts; coal-tar, twelve parts; and nitrate of potassa, chlorate of potassa, or sulphur, one part.

The proportional quantity of the ingredients may be varied, according to the different qualities of the materials used and the nature of the substance to which it may be applied as a base. Thus, sixty-five parts of resin may be used with thirteen parts of coal-dust or sawdust, instead of seventy-five parts of resin; and when sulphur is used instead of nitrate or chlorate of potassa the proportion may be varied to seventy-five parts of resin and three parts of sulphur, or such other variation of the quantities of the ingredients as shall best produce the desired result.

We are aware that resin has long been used as a kindling material, and consequently do not claim it as new; but we claim the compound as an improvement for the following reasons: First, that resin is of itself a brittle substance, having little tenacity or elasticity, and when applied as a coating to wood, coke, coal, or other material it crumbles and drops off upon a slight attrition, or, when burning, will often drop, and with it the fire, and thus prevent the ignition of the base material. Second, when compounded as above the combination of the coal and acid tar forms an adhesive and elastic material, which, unaffected by sun or weather, will retain its qualities in any climate. Third, the resin gives it a sufficient degree of hardness to make it perfectly neat and clean, so that it may be handled with white gloves without sticking, smutting, or soiling, and is devoid of any offensive smell while burning. Fourth, the addition of nitrate or chlorate of potassa increases the combustible qualities to such a degree that it will instantly ignite with a match and burn at once with a full strong blaze.

It may be applied in a manner as follows: The ingredients are placed in an iron boiler or kettle and heated by a steady fire to near the boiling-point. Then take the common bunches of kindling-wood and dip one end to the extent of an inch or so in the mixture, which will make it highly combustible; or a quantity of the loose wood may be entirely saturated, and one or two sticks placed in each bundle of the kindlings as they are tied up. Coke, peat, sawdust, coal-dust, corn-cobs, or any other porous, absorbent, and carboniferous material may be used as a base.

Claim.

We claim—

The combination of resin, coal-tar, acid tar, nitrate or chlorate of potassa, and sulphur with coal-dust, sawdust, or other carbonaceous matter, under the name of Pluto's matches, in the manner and for the purposes herein specified.

SILAS L. LOOMIS.
CHARLES T. SHEPHERD.

Witnesses:
J. L. ROBERTS,
T. C. CLARK.